(12) United States Patent
Teuwen et al.

(10) Patent No.: US 8,694,778 B2
(45) Date of Patent: Apr. 8, 2014

(54) ENROLLMENT OF PHYSICALLY UNCLONABLE FUNCTIONS

(75) Inventors: Philippe Teuwen, Ixelles (BE);
Ventzislav Nikov, Haasrode (BE)

(73) Assignee: NXP B.V., Eindhoven (NL)

( * ) Notice: Subject to any disclaimer, the term of this patent is extended or adjusted under 35 U.S.C. 154(b) by 597 days.

(21) Appl. No.: 12/950,748

(22) Filed: Nov. 19, 2010

(65) Prior Publication Data

US 2012/0131340 A1    May 24, 2012

(51) Int. Cl.
*H04L 9/32* (2006.01)
(52) U.S. Cl.
CPC ............ *H04L 9/3278* (2013.01); *H04L 9/3271* (2013.01); *H04L 9/3273* (2013.01); *H04L 9/3242* (2013.01)
USPC ........................................................ 713/168
(58) Field of Classification Search
None
See application file for complete search history.

(56) References Cited

U.S. PATENT DOCUMENTS

| | | | |
|---|---|---|---|
| 2006/0210082 A1* | 9/2006 | Devadas et al. | 380/277 |
| 2009/0083833 A1* | 3/2009 | Ziola et al. | 726/2 |
| 2009/0222672 A1* | 9/2009 | Clarke et al. | 713/189 |
| 2011/0191837 A1* | 8/2011 | Merchan et al. | 726/6 |
| 2011/0215829 A1* | 9/2011 | Merchan et al. | 326/8 |
| 2011/0286599 A1* | 11/2011 | Tuyls et al. | 380/278 |
| 2012/0204023 A1* | 8/2012 | Kuipers et al. | 713/150 |

* cited by examiner

*Primary Examiner* — Andrew L Nalven
*Assistant Examiner* — Christopher Ruprecht

(57) ABSTRACT

Aspects of the present disclosure are directed toward a method that includes a physically-unclonable function (PUF) device that receives a communication that includes a first challenge value, a second challenge value and a remote message authenticity value. The method includes the generation of additional challenge-response pairs in a secure manner. The additional challenge-response pairs are securely communicated between the PUF device and an authenticating server or other device for subsequent use in authentication.

19 Claims, 5 Drawing Sheets

ENROLLMENT OF PHYSICALLY UNCLONABLE FUNCTIONS

The present invention relates generally to physically unclonable functions, and more specifically, to provide security for an enrollment process that can continue during or after a challenge-response authentication process.

The present disclosure is exemplified in a number of implementations and applications, some of which are summarized below.

Consistent with embodiments of the present disclosure, a method includes a physically unclonable function—(PUF) enabled device that receives a communication that includes a first challenge value, a second challenge value and a remote message authenticity value. The PUF-enabled device generates a first response value from the first challenge value by entering the first challenge value into a PUF circuit. The PUF-enabled device also generates a plurality of keys by applying the first response value to a key generation circuit. The PUF-enabled device verifies the received message authenticity value by comparing the remote message authenticity value to a value generated from the one of the plurality of keys. The PUF-enabled device then generates a second response value to the second challenge value by entering the second challenge value into the PUF circuit. A local message authenticity value is generated from a second one of the plurality of keys and by the PUF-enabled device. The PUF-enabled device encrypts, using a third one of the plurality of keys and the second response value and then a local message authenticity value is used to authenticate the message. The PUF-enabled device then transmits the encrypted second response value and message authenticity value.

Embodiments of the present disclosure are directed toward a device that has a transceiver circuit configured and arranged to receive and transmit messages. The device also includes a PUF circuit configured to respond to a challenge value by generating a response value and a processing circuit configured and arranged to process messages from the transceiver circuit by performing a variety of functions. The processing circuit is configured to identify, from a message, a first challenge, a second challenge and a remote message authenticity value and to submit the first challenge to the PUF circuit. The processing circuit is also configured to receive a first response from the PUF circuit and to generate a plurality of keys from the first response. Other functions that the processing circuit is configured to perform include submission of the second challenge to the PUF circuit and the receipt of a second response from the PUF circuit. The processing circuit is also configured to encrypt, using a third one of the plurality of keys, the second response. Thereafter, the processing circuit generates a local message authenticity value from a second one of the plurality of keys. This local message authenticity value can be used to authenticate the message. The processing circuit can then use the resulting encrypted second response and the local message authenticity value for submission to the transceiver circuit for transmission thereof.

Consistent with embodiments of the present disclosure, a system includes an authentication device which has a non-transitory storage medium containing challenge-response pairs associated with one or more identification values and including a respective challenge value and response value. The authentication device can also include a transceiver circuit configured and arranged to communicate with external devices and a processing circuit coupled to the transceiver and the non-transitory storage medium and configured and arranged to retrieve a challenge-response pair in response to receipt of an identification value. The processing circuit is also configured to derive a set of key values from a response value of the challenge-response pair and to generate a first authentication value from a first key value of the set of key values. The processing circuit can also be configured to send a transmission request to the transceiver circuit, the transmission request including an additional challenge value and the first authentication value and thereafter receive a data transmission from the transceiver circuit. The processing circuit is further configured to verify the data transmission by comparing data in the data transmission to both the response value of the challenge-response pair and a third key value of the set of key values. The processing circuit is also configured to decrypt the data transmission using a second key value of the set of key values and to store an additional challenge-response pair that includes the additional challenge value and an additional response value received as part of the data transmission.

The above discussion is not intended to describe each embodiment or every implementation of the present disclosure. The figures and detailed description that follow more particularly exemplify various embodiments.

The invention may be more completely understood in consideration of the following detailed description of various embodiments of the invention in connection with the accompanying drawings, in which.

Figure 1:
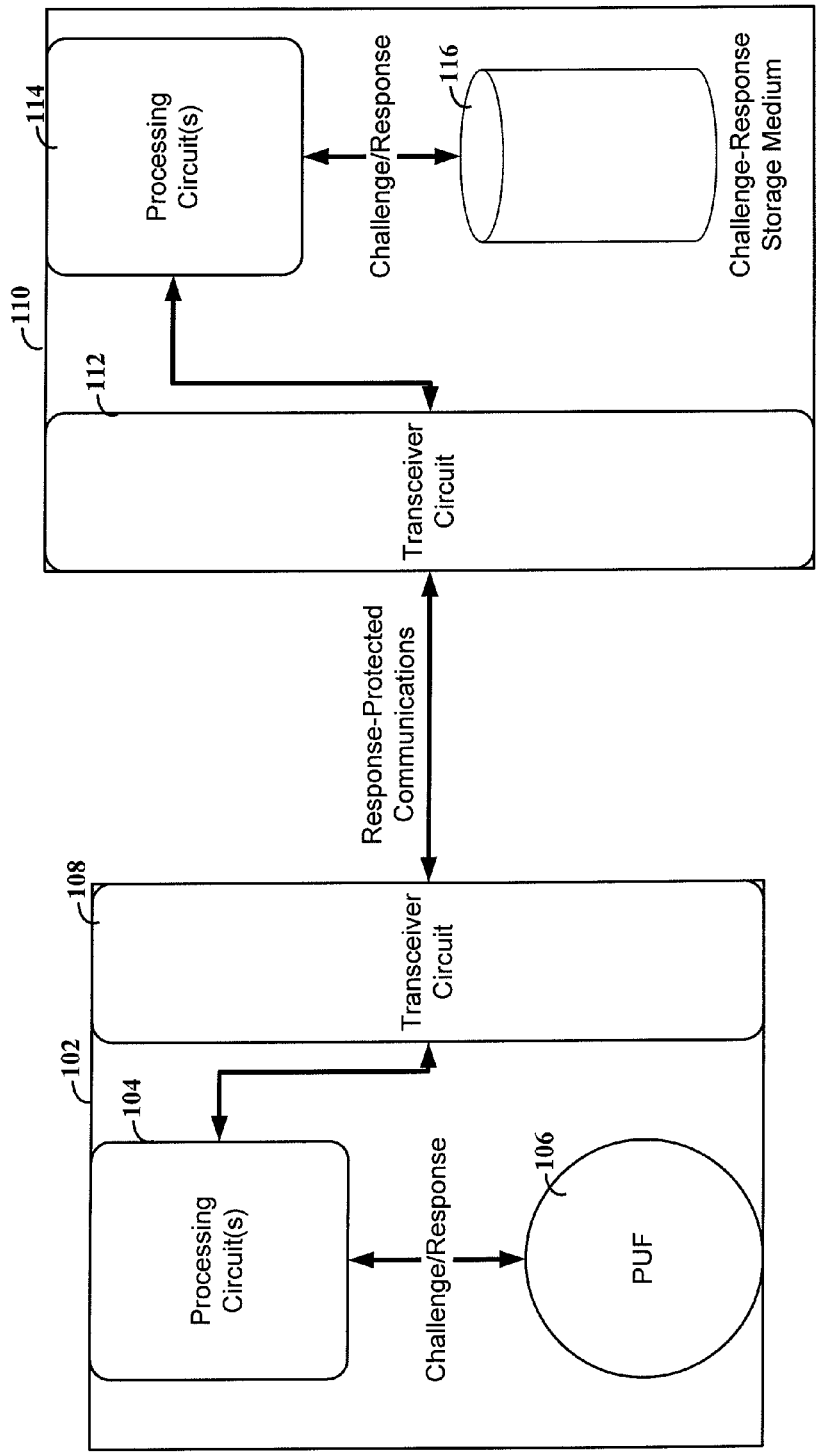
FIG. 1 depicts a block diagram for providing authentication using a physically unclonable function, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined by the claims.

The present disclosure is believed to be applicable to a variety of different types of processes, devices and arrangements for use with physically unclonable functions. While the present invention is not necessarily so limited, various aspects of the invention may be appreciated through a discussion of examples using this context.

According to an example embodiment of the present disclosure, a device is configured to provide secure authentication using physically unclonable functions (PUFs). The device is configured to operate using a challenge-response protocol. As part of the protocol, the device receives a challenge and uses a PUF structure to generate a response. This challenge and response forms a challenge-response pair. The device can then provide the generated response to the provider of the challenge. The provider of the challenge authenticates the device by comparing the received response to a previously-obtained challenge-response pair. The provider of the challenge can be configured to expire (e.g., be consumed to avoid reuse) the challenge-response pair once it has been used. Accordingly, the device is configured with a protocol that provides additional challenge-response pairs in a secure manner. The security is provided using response data to protect (through encryption) the additional challenge-response pairs.

Particular embodiments of the present disclosure are directed toward the use of an authentication using a challenge-response PUF to provide additional challenge-response pairs for future authentication. A response to a challenge is used to generate one or more key values that are used to secure and authenticate transmissions. In this manner, additional challenge-response pairs can be provided with a high-level of security and thereafter used in a future challenge-response-based authentication.

Aspects of the present disclosure relate to circuit-implemented methods consistent with the various embodiments discussed herein. The circuit can perform the method using one or more of a specially-programmed processor that is configured with a non-transitory storage medium that stores executable instructions, programmable logic circuitry and/or specially-designed logic circuitry.

Consistent with embodiments of the present disclosure, a method is carried out by a device that is configured to receive a communication that includes a first challenge value, a second challenge value and a remote message authenticity value. The device is configured to generate a first response value to the first challenge value by entering the first challenge value into a PUF circuit. The device is configured to generate a plurality of keys by applying the first response value to a key generation circuit, such as a specially-programmed processor, programmable logic circuit or specially-designed logic circuit. The device is also configured to verify the received message authenticity value by comparing the remote message authenticity value to a value generated from the one of the plurality of keys. The device is configured to generate a second response value to the second challenge value by entering the second challenge value into the PUF circuit. The device is further configured to encrypt, using a third one of the plurality of keys, the second response value. The device is also configured to generate a local message authenticity value from a second one of the plurality of key and to use the local message authenticity value to authenticate the message. The device is also configured to transmit the encrypted second response value and local message authenticity value.

Other embodiments of the present disclosure are directed toward a device that includes a transceiver circuit configured and arranged to receive and transmit messages. The device also includes a PUF circuit. This PUF circuit responds to a challenge value by generating a response value. The PUF circuit generates the response by applying the challenge to a physical structure that has complex physical properties. This physical structure provides an output that is a function of both the challenge and the complex physical properties. A processing circuit is configured and arranged to process messages from the transceiver circuit. This processing includes identifying, from a message, a first challenge, a second challenge and a remote message authenticity value. The processing involves the presentation of the first challenge to the PUF circuit. The PUF circuit produces a first response, which is received by the processing circuit. The process proceeds with the processing circuit generating a plurality of keys from this first response. The processing circuit then submits the second challenge to the PUF circuit and subsequently receives a second response from the PUF circuit. The processing circuit next encrypts, using a third one of the plurality of keys, the second response. A local message authenticity value is then generated from a second one of the plurality of keys and used to authenticate the message. The resulting message is then submitted to the transceiver circuit for transmission thereof.

Although not limited thereto, several example PUF structures are discussed hereafter. Some examples use properties of a circuit-based or silicon PUF circuit. These types of PUF circuits can use, for example, the variations in manufacturing process to produce random circuits with sufficient complexity. This can be implemented, for example, using properties of a delay loop, such as a ring oscillator. Other logic, such as multiplexors can also be used. A particular example presents the challenge value to a set of circuits configured to provide outputs based upon race conditions. In this manner, the physical properties of circuit components cause the delays. These physical properties determine the response to a particular challenge. Various other circuits are possible, e.g., a circuit that is sufficiently complex and for which the same chip layout provides different results due to the random variation of the circuit components. Other possibilities include, but are not limited to, the use of physical structures that can be accessed by a circuit, whether optical, magnetic, mechanical or otherwise.

Various embodiments of the present disclosure are directed toward the use of different operating modes relative to how access to the PUF structure is provided. One such mode is referred to as an initialization mode in which access to the PUF structure is unrestricted. In this mode the PUF structure can be used to generate a set of responses for a series of challenges. An authentication database can be generated for this and other devices by storing sets of challenge-responses for each device. This initialization mode might be implemented, for example, immediately after the device has been manufactured.

The initialization mode can be implemented using a control circuit or processing circuit configured to provide unencrypted and/or otherwise unsecure response values. The initialization mode thereby allows the generation and transmission of one or more response values to an authenticating device. The authenticating device can receive the one or more response values and store the challenge and response value(s) for later use. Thereafter, a command can be sent to the device to place the control circuit in a standard mode in which responses to challenges are provided encryption and/or other security measures.

Thereafter, the device can be placed in a standard/secure mode. In the secure mode, the device is configured to limit access to the PUF structure. This can be particularly useful for preventing a nefarious party from generating valid challenge-response pairs that could be used in an attempt to spoof the device. The device can implement this security by implementing encryption/hash function(s) to protect the challenge-response pair and/or by requiring verification information before access is granted.

Consistent with various embodiments of the present disclosure, during secure mode, a single, additional challenge-response pair is generated for each authentication. Assuming that challenge-response pairs are not reused, the number of challenge-response pairs stored in an authentication database will remain constant as an additional challenge-response pair will be generated for each authentication. Invalid or failed authentications, however, may result in the loss of a useable challenge-response pair without generating a new/additional challenge-response pair. Accordingly, embodiments of the present disclosure allow the device to be configured to operate in a catch-up mode. While in the catch-up mode, the device can provide multiple new/additional challenge-response pairs for a single authentication. Accordingly, the number of challenge-response pairs stored in an authentication database can be increased, e.g., to account for failed authentications. This catch-up mode can be implemented, for example, by allowing the standard mode to respond to multiple additional challenges or by having a disparate mode initiated by a request or command. In the former implementation, the catch-up mode is primarily an extension of the standard mode that is triggered by the receipt of multiple additional challenges.

Aspects of the present disclosure are directed towards embodiments that protect against spoofing of a device identifier. In certain implementations, the device identifier can be a unique identifier (UID) that distinguishes the device from other valid devices. Challenge-response pairs can be associated with a particular UID. A device provides this UID so that the proper challenge-response pair can be used during the authentication. A third party may, however, spoof the UID. The inability to provide the proper PUF response by the third party would prevent the third party from using the UID to pretend to be the true PUF-protected device. Notwithstanding, failed authentication attempts might result in the consumption of all challenge-response pairs associated with the spoofed UID. Accordingly, the system can be configured to detect that the challenge-responses have been used up (or dropped below a threshold level) for a particular UID. The authentication database control server can then stop issuing challenge-responses for the particular UID. Instead of a challenge, the control server can send a message that informs the device that a new UID should be activated (to replace the current UID).

In one implementation, both the device and the control server have one or more alternative UIDs stored in a list. Since both the device and the control server have the alternative UID(s) already, they can each change the active UID to the next alternative UID in the list without transmitting the UID information. In this manner, the spoofing party does not gain knowledge of the new UID. Thereafter, the control server can ignore requests from the old UID.

Turning now to the figures, FIG. 1 depicts a block diagram for providing authentication using a physically unclonable function (PUF), consistent with embodiments of the present disclosure. The block diagram includes two devices 102, 110 that communicate using transceiver circuits 108 and 112, respectively. Device 102 includes a processing circuit 104 and a PUF 106. Device 110 includes a non-transitory storage medium 116 that stores information about challenge-response pairs generated by the PUF 106.

The devices 102 and 110 authenticate themselves using challenge-response pairs. Moreover, the devices use data from challenge-response (e.g., response data) pairs to protect the communications. This protection can include the use of authentication data derived from a response value and the use of encryption using a response value. For instance, the devices 110 can be configured to generate keys from a response value stored in the storage medium 116. These keys can serve as identification values and/or encryption keys. Device 102 can generate a corresponding set of keys using PUF 106 and a corresponding challenge provided by device 110. Additional/new challenge-response values can thereby be authenticated and encrypted using one or more keys known only to devices 102 and 110.

Figure 2:
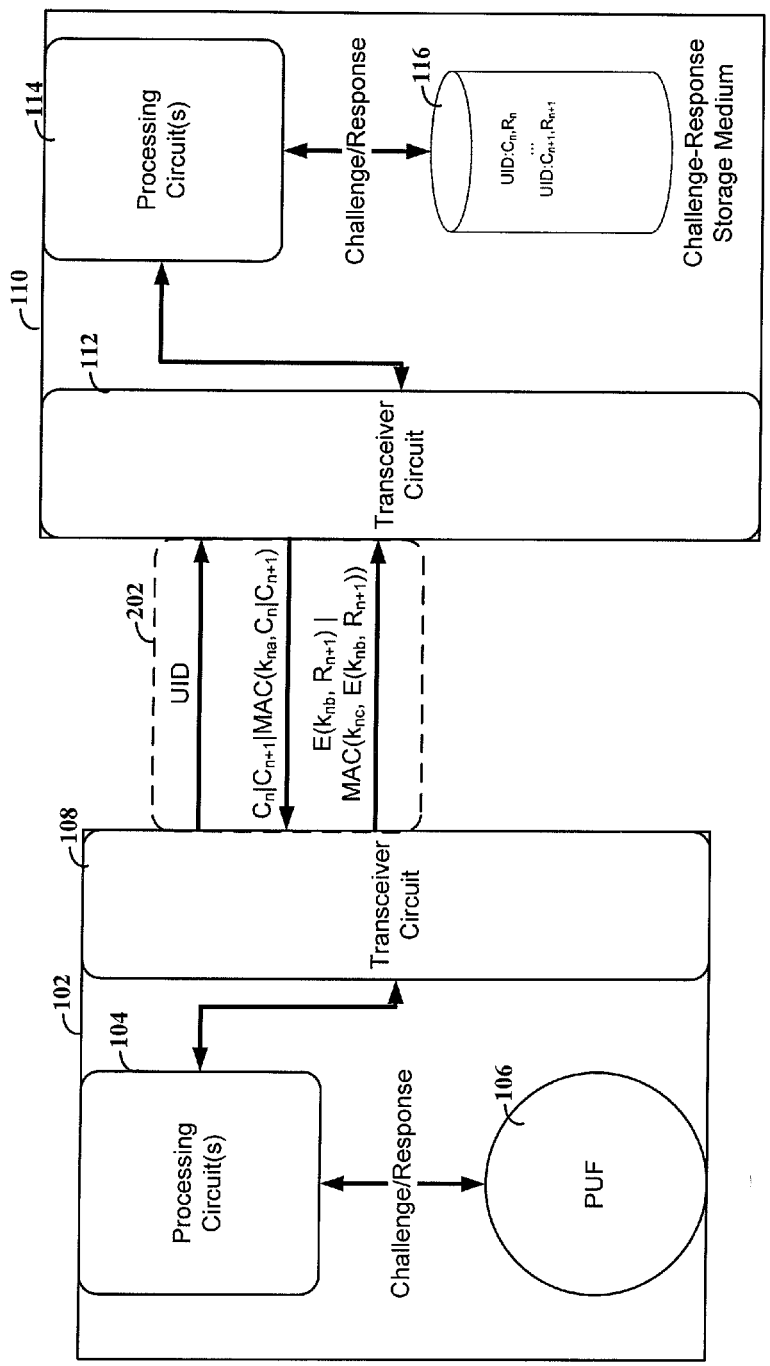
FIG. 2 depicts a block diagram and message protocol for providing authentication using a physically unclonable function, consistent with embodiments of the present disclosure.

FIG. 2 depicts a block diagram and message protocol for providing authentication using a PUF, consistent with embodiments of the present disclosure. Maintaining the numbering from FIG. 1 for similar block components, the devices 102 and 110 communicate with one another using the protocol 202. This protocol involves a first message sent from device 102 to device 110. This first message includes a UID that allows the device 110 to identify and distinguish device 102 from other PUF-based devices. The second message includes a first challenge ($C_n$), a second challenge ($C_{n+1}$) and a Message Authentication Code (MAC($k_{na}$)). The device 102 responds with a third message that includes a second response value ($R_{n+1}$) (which can be encrypted). This third message can be encrypted using a key and appropriate encryption algorithm (E($k_{nb}$)). The device 102 can also use a key ($k_{nc}$) to perform an authentication MAC($k_{nc}$) of the encrypted message.

Figure 3:
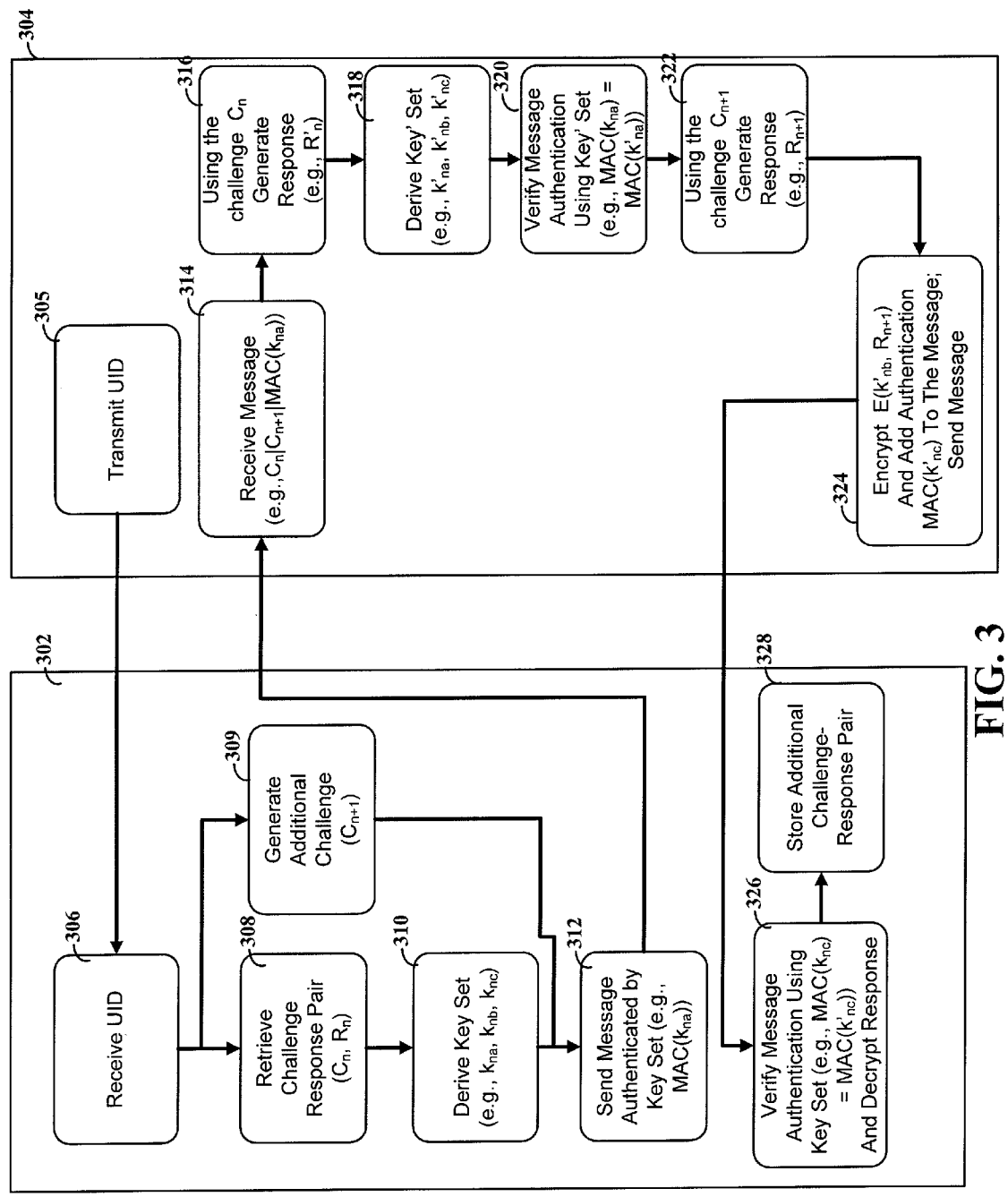
FIG. 3 depicts a flow diagram involved in the generation and transmission of the messages discussed in connection with FIG. 2, consistent with embodiments of the present disclosure.

FIG. 3 depicts a flow diagram involved in the generation and transmission of the messages discussed in connection with FIG. 2, consistent with embodiments of the present disclosure. Device 110/302 receives the UID from device 102/304 at block 306. Device 110/302 uses the UID to retrieve a first challenge-response pair ($C_n$, $R_n$) from the storage medium 116 at block 308. Device 110/302 also generates a new challenge ($C_{n+1}$) at block 309. This new challenge can be generated in a number of different manners including, but not limited to, randomly generated numbers or a predetermined list of numbers (e.g., pseudorandom numbers).

Device 110/302 uses the first response $R_n$ to generate three values or keys ($k_{na}$, $k_{nb}$, $k_{nc}$) at block 310. In one implementation, the key values could be portions of the first response $R_n$. For additional security, the key values can be generated using one or more cryptographic hash functions applied to the first response $R_n$ and/or portions thereof. Other key generation methods and algorithms are possible.

Device 110/302 selects one of the keys ($k_{na}$) to use as an authentication. In certain embodiments, this authentication key ($k_{na}$) is used to generate a Message Authentication Code (MAC). The MAC algorithms can be implemented using a one-way hash algorithm, such as HMAC-MD5, HMAC-SHA-1 or HMAC-SHA-256. The resulting MAC($k_{na}$) represents an authentication value that can be verified by a device that knows the value of $k_{na}$ and the proper MAC algorithm. Device 110/302 then generates and transmits a second message that includes the first response ($R_n$) (corresponding to the challenge-response pair $C_n$ and $R_n$), the new challenge ($C_{n+1}$) and the MAC($k_{na}$), as shown by block 312.

Device 102/304 receives (block 314) and processes this second message (e.g., $C_n|C_{n+1}|MAC(k_{na},C_n|C_{n+1})$). The device 102/304 applies the first challenge value ($C_n$) to the PUF 106. This results in the generation of a response ($R'_n$) as shown by block 316. Device 102/304 uses the response $R'_n$ to generate three values or keys ($k'_{na}$, $k'_{nb}$, $k'_{nc}$) as shown by block 318.

Device 102/304 uses $k'_{na}$ to verify that authenticity of device 110/302 and the second message MAC($k_{na}$) at block 320. This can be accomplished by generating MAC($k'_{na}$) and comparing to the received MAC($k_{na}$). If the values match, then the authentication is validated. This also suggests that $R'_n \equiv R_n$ and that $k'_{na}$, $k'_{nb}$, $k'_{nc} \equiv k_{na}$, $k_{nb}$, $k_{nc}$.

Device 102/304 next generates an additional response $R_{n+1}$ by applying $C_{n+1}$ to the PUF. This results in an additional response pair ($C_{n+1}$, $R_{n+1}$) as noted by block 322. Device 102/304 next generates and transmits a third message (e.g., E($k_{nb}$, $R_{n+1}$) |MAC($k_{nc}$, E($k_{nb}$, $R_{n+1}$))) at block 324. This third message includes the additional response ($R_{n+1}$) and an authentication of the device 102/304 (MAC($k'_{nc}$)) that can be encrypted using a key derived from the first response ($R'_n$). In certain embodiments, this encryption can be implemented using a symmetric encryption technique.

Device 110/302 receives the third message, which is authenticated by the device 102/304 and then decrypted as shown by block 326. This authentication can be accomplished by comparing a received MAC($k_{nc}$) to a locally-generated MAC($k'_{nc}$). In response to the authentication, device 110/302 store $C_{n+1}$ and $R_{n+1}$ in a database as shown by block 328.

Embodiments of the present invention include various data protection/encryption techniques such as randomizing UIDs and introducing random nonces or dummy data. These techniques are examples of the multitude of possible techniques that can be used.

Figure 4:
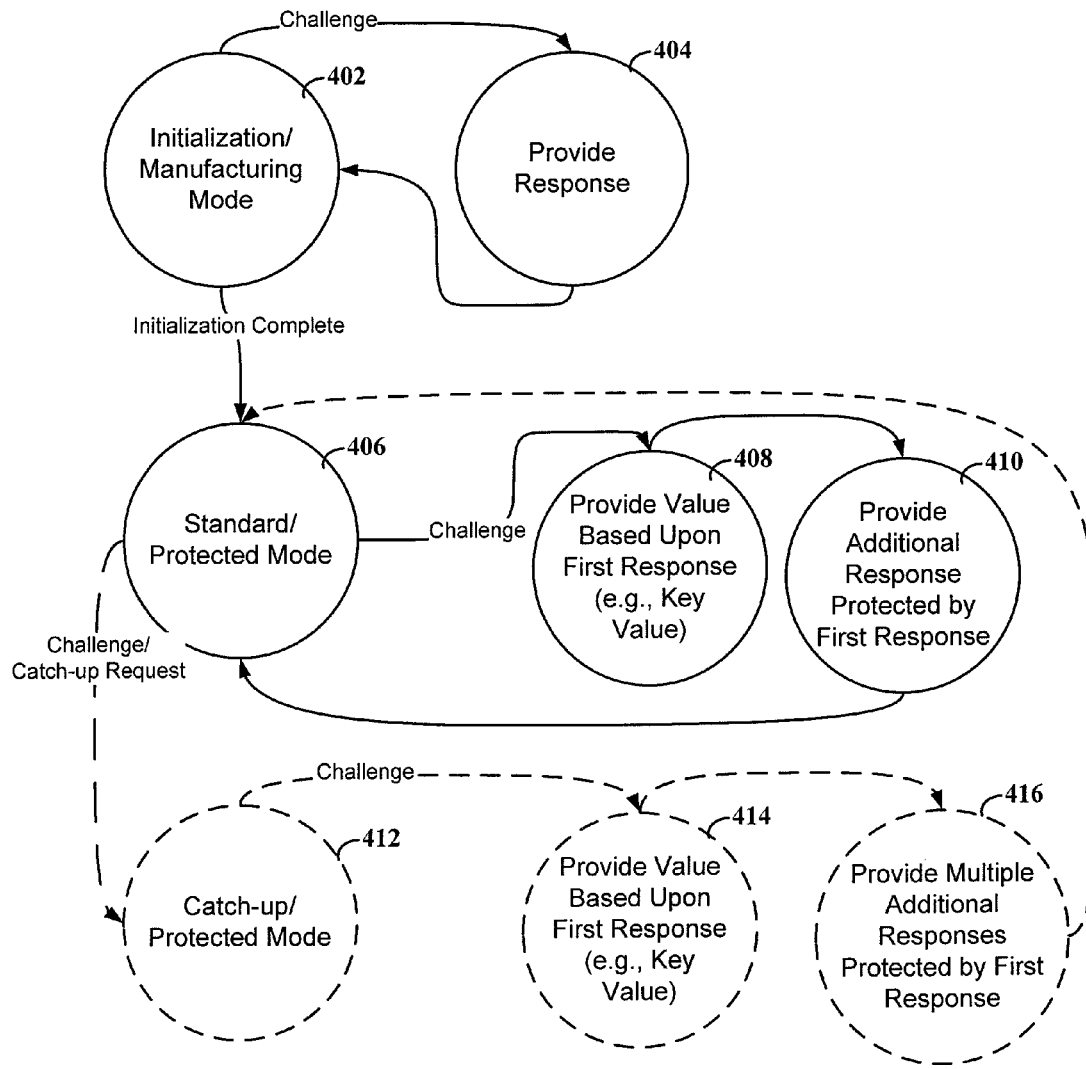
FIG. 4 depicts a state diagram having several modes of operation for a device, consistent with embodiments of the present disclosure.

FIG. 4 depicts a state diagram having several modes of operation for a device, consistent with embodiments of the present disclosure. PUF-capable devices generally rely upon physical characteristics that are sufficiently complex and/or random that they are virtually impossible to predict or model. Accordingly, the challenge-response pairs are not known until after the PUF-capable device has been manufactured. Consistent therewith, a PUF-capable device can be configured to operate in an initialization/manufacturing mode 402. While in the initialization mode 402, the device responds to a challenge by providing a response 404. This allows a database of challenge-response pairs to be built up. Other operations that can be performed during initialization mode 402 include, but are not limited to, generation and sharing of secret (hash) keys and/or public-private keys.

The initialization mode 402 is generally limited to secure communications that are not susceptible to external attacks or monitoring. For instance, the communication can use a direct connection between the device and local server and associated local database, rather than over an unsecured network, such as the Internet.

Once a sufficient number of challenge-response pairs have been generated and stored in a database, the device leaves the initialization state to enter a standard/protected mode 406. In embodiments of the present disclosure, the transition between the initialization mode 402 and the standard mode 406 can be a one-way transition that cannot be reversed. Accordingly, a potential attacker cannot place the device into the initialization mode to obtain information about the PUF and/or to generate a number of challenge-response pairs to spoof the device. Consistent with certain embodiments, the transition can be accomplished using a command that causes the device to enter a logical state that cannot return to the initialization state. In certain implementations, the command involves a physical modification of the device, such as blowing an internal fuse.

While in standard mode 406, the device responds to a challenge value by providing a value based upon a first response. This first response can be generated by applying the challenge value to the PUF, as shown by state 408. This response value can be used to generate a response value that can be used to verify/authenticate the source of the challenge. Moreover, during the standard mode, the device can provide an additional response value corresponding to a second challenge value as shown by state 408. This value can be protected (e.g., encrypted and authenticated) using the previous response value, which should be known only by an authentic challenger and the device. Accordingly, the number of challenge-response pairs can be continuously maintained.

Consistent with optional embodiments of the present disclosure, the device can be configured to operate in a catch-up mode 412. This catch-up mode can be used to compensate for challenge-response pairs being used without a corresponding replenishment using the additional response state 410. This problem can occur, for example, when problems arise with the authentication process. For instance, a failed authentication might occur when an attacker attempts to spoof the PUF-enabled device. In another instance, a failed authentication could occur where the PUF generates a different response value relative to the originally-generated response value.

According to embodiments of the present disclosure, the catch-up request can be a message that contains multiple challenges. The message can be formatted in a manner that is consistent with various single-additional challenge messages as discussed herein (e.g., $C_n|C_{n+1}| \ldots |C_{n+i}|$MAC($k_{na}$, $C_n|C_{n+1}| \ldots |C_{n+i}$)). The PUF-enabled device provides a message having multiple response values consistent other messages discussed herein (e.g., E($k_{nb}$,$R_{n+1}| \ldots |R_{n+i}$)|MAC($k_{nc}$, E($k_{nb}$, $R_{n+1}| \ldots |R_{n+i}$)).

According to other embodiments of the present disclosure, the catch-up request (or command) can be initiated using a special request value (S). This special request value can be derived from, or otherwise secured, a shared secret between the authenticating server/device and the PUF-enabled device. This can be useful for preventing a spoofing device from obtaining a large number of response pairs from a single request.

In response to receiving a challenge and catch-up request, the PUF-enabled device can enter the catch-up mode 412. The challenge and catch-up request can contain multiple additional challenges. The first challenge is used to generate a first response value, as shown by state 414. The device can use this first response value to both authenticate the source of the challenge request and to protect the multiple additional responses generated from the multiple additional challenges, as shown by state 416.

Figure 5:
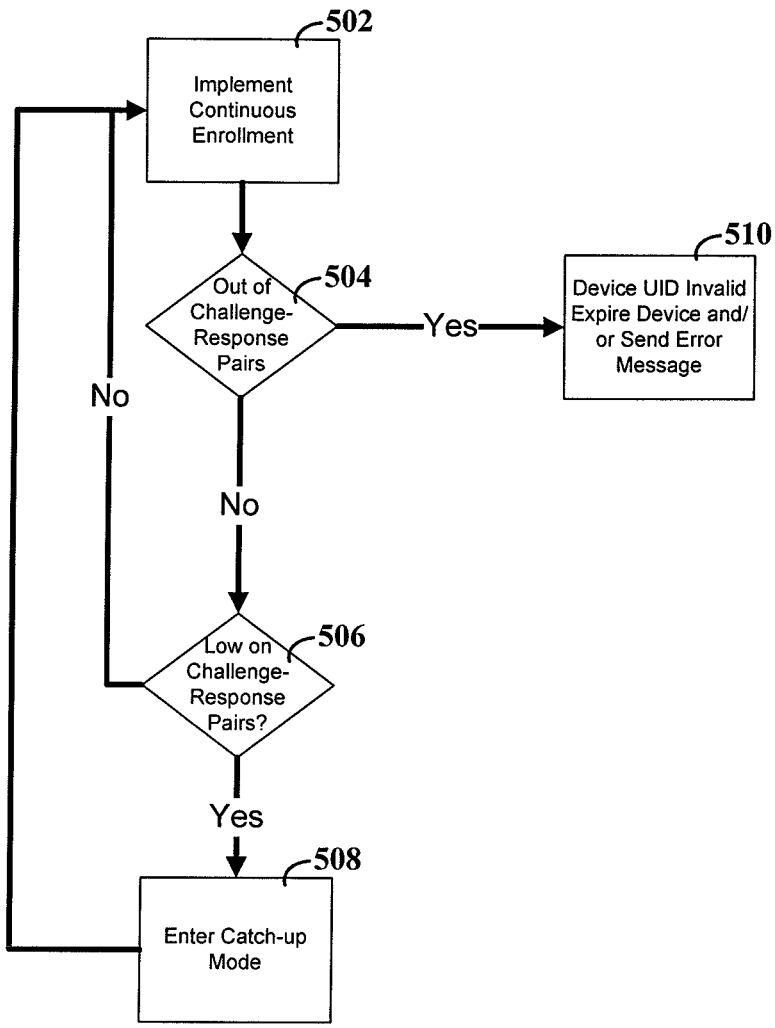
FIG. 5 depicts a flow diagram that includes an option for changing device identifiers, consistent with embodiments of the present disclosure.

FIG. 5 depicts a flow diagram that includes an option for changing UIDs, consistent with embodiments of the present disclosure. In certain instances, a spoofing device could cause all response-pairs associated with a spoofed UID to be consumed or otherwise invalidated. This occurs because even though a spoofing device might discover or otherwise use a UID, the spoofing device is unable to provide valid responses to challenges associated with the UID. Accordingly, a spoofing device could fail to properly respond to challenges and cause all challenge-response pairs for the UID to be consumed without additional challenge-response pairs being generated and stored at the authenticating server. Thereafter, the authentic device associated with the UID is no longer able to be authenticated because all challenge-response pairs have been consumed.

As shown in FIG. 5, the continuous enrollment 502 is used during normal operation. This allows for an additional response-pair to be generated for each challenge-response pair that is consumed. A first check 504 determines whether or not all valid challenge-response pairs have been used (or whether or not the valid challenge-response pairs have dropped below a first threshold level). If all response pairs have not been used, a second check 506 determines whether or not the database is low (e.g., below a second-higher threshold level) on challenge-response pairs. If the database is not low on challenge-response pairs, the continuous enrollment 502 can continue. If, however, the database is low on challenge-response pairs, the device can enter a catch-up mode 508. The catch-up mode 508 allows for multiple additional challenge-response pairs to be generated for a single consumed challenge-response pair and thereby increases the level of challenge-response pairs stored in the database.

If there are no remaining valid challenge-response pairs, the authenticating device can implement an appropriate action 510. This action can include, for example, the expiration of the device to block further authentication efforts and/ or error handling routines. The error handling routines might include notification to the PUF-enabled device, which can be used to notify a user of the device.

Consistent with various embodiments, the UID can be changed after every successful protocol exchange between the PUF-enabled device and the authentication server or device. This modification can be based on a secret UID derivation mechanism known by both parties.

While the present invention has been described above and in the claims that follow, those skilled in the art will recognize that many changes may be made thereto without departing from the spirit and scope of the present invention.

What is claimed is:

1. A method comprising:
    receiving a communication that includes a first challenge value, a second challenge value and a remote message authenticity value;
    generating a first response value to the first challenge value by entering the first challenge value into a physically unclonable function (PUF) circuit;
    generating a plurality of keys by applying the first response value to a key generation circuit;
    verifying the received message authenticity value by comparing the remote message authenticity value to a value generated from a first one of the plurality of keys;
    generating a second response value to the second challenge value by entering the second challenge value into the PUF circuit;
    encrypting, using a second one of the plurality of keys, the second response value; and
    generating a local message authenticity value from a third one of the plurality of keys;
    transmitting the encrypted second response value and the local message authenticity value.

2. The method of claim 1, further including the step of transmitting a device identifier wherein encrypting the second response value includes the use of a symmetric encryption scheme in which the second one of the plurality of keys is used in both encryption and decryption.

3. The method of claim 1, further including an initialization process that includes placing a control circuit for limiting access to the PUF circuit in a initialization mode that configures the control circuit to respond to challenges by providing responses in an unencrypted form and thereafter placing the control circuit in a standard mode that configures the control circuit to respond to challenges by providing responses in an encrypted form.

4. The method of claim 3, wherein placing the circuit in a standard mode includes blowing a fuse.

5. The method of claim 1, further including, at a remote device configured to authenticate a device containing the PUF circuit using a challenge-response pair,
    retrieving the first challenge value and a corresponding stored-response value from a memory;
    generating the second challenge value;
    generating another plurality of keys by applying the stored-response value to a key generation circuit;
    generating the remote message authenticity value from a first one of the other plurality of keys and both of challenge values;
    transmitting the communication that includes the first challenge value, the second challenge value and the remote message authenticity value;
    receiving the encrypted second response value and the local message authenticity value;
    verifying the local message authenticity value;
    decrypting the second response value; and
    storing the second challenge value and second response value response.

6. The method of claim 1, further including a step of receiving a catch-up mode request and, in response thereto, providing multiple response values in response to multiple challenge values received in connection with a single verification of the received message authenticity value.

7. The method of claim 1, further including steps of
    determining that a current number of challenge-response pairs, stored in an authentication server remote from a device containing the PUF circuit, is below a threshold level; and
    in response to determining that the number of challenge-response pairs is below the threshold level, transmitting multiple additional challenge values in connection with a single verification of the received message authenticity value.

8. A device comprising:
    a transceiver circuit configured and arranged to receive and transmit messages;
    a physically unclonable function (PUF) circuit configured to respond to a challenge value by generating a response value;
    a processing circuit configured and arranged to
    transmit a device identification value to the transceiver circuit for transmission thereof; and
    process messages from the transceiver circuit by
        identifying, from a message, a first challenge value, a second challenge value and a remote message authenticity value;
        submitting the first challenge value to the PUF circuit;
        receiving a first response from the PUF circuit;
        generating a plurality of keys from the first response value;
        verifying the remote message authenticity value by comparing to the remote message authenticity value a value generated from the first one of the plurality of keys and both the first and second challenge values;
        submitting the second challenge value to the PUF circuit;
        receiving a second response value from the PUF circuit;
        encrypting, using a third one of the plurality of keys, the second response value;
        generating a local message authenticity value from a second one of the plurality of keys; and
        submitting the encrypted second response and the local message authenticity value to the transceiver circuit for transmission thereof.

9. The device of claim 8, wherein the PUF circuit provides an output based upon one or more of the random variations in delays of wires and gates therein, Static-Random-Access Memory (SRAM) characteristics, cross-coupling of two latches or flip-flops and a magnetic PUF.

10. The device of claim 8, wherein the processing circuit includes one or more of a specially-programmed processor, a configurable logic array and logic circuitry.

11. The device of claim 8, wherein generating a plurality of keys from the first response includes the use of one or more hash functions.

12. The device of claim 8, wherein the processing circuit is further configured and arranged to operate in an initialization mode during which responses to challenges are provided without encryption and thereafter operate in a standard mode in which responses to challenges are encrypted.

13. The device of claim 12, wherein the processing circuit is further configured and arranged to irreversibly transition from the initialization mode to the standard mode in response to a command.

14. The device of claim 8, wherein the processing circuit includes a non-transitory storage medium storing instructions that when executed by the processing circuit process the messages.

15. The device of claim 8, wherein the processing circuit is further configured and arranged to generate a local message authentication value using one-way hash algorithm and to compare the local message authentication value to the remote message authenticity value.

16. A system comprising:
an authentication device having
    a non-transitory storage medium containing challenge-response pairs associated with one or more identification values, each identification value having one or more challenge-response pairs that include a respective challenge value and a respective response value;
    a transceiver circuit configured and arranged to communicate with external devices; and
    a processing circuit coupled to the transceiver and the non-transitory storage medium and configured and arranged to
        retrieve a challenge-response pair that corresponds to a received identification value, the challenge-response pair including a first challenge value and a first response value;
        generate a second challenge value;
        derive a set of key values from the first response value;
        generate a first authentication value from a first key value of the set of key values and from both the first and second challenge values;
        send a transmission request to the transceiver circuit, the transmission request including both the first and second challenge values and the first authentication value;
        receive a data transmission from the transceiver circuit;
        identify, from a message, an encrypted response and a remote message authenticity value
        verify the data transmission by comparing the remote message authenticity value with a message authenticity value generated from a third key value of the set of key values and the encrypted response;
        decrypt the data transmission using a second key value of the set of key values; and
        store, in connection with the identification value, an additional challenge-response pair that includes the additional challenge value and an additional response value received as part of the data transmission.

17. The system of claim 16, further including one or more devices having PUF circuits that generate a response value from an input challenge value.

18. The system of claim 16, wherein the processing circuit is further configured and arranged to decrypt the data transmission using a second key value of the set of key values and a symmetric decryption algorithm.

19. The system of claim 16, wherein the processing circuit is further configured and arranged to
    issue challenges to a PUF device in an initialization mode;
    receive in an unencrypted form responses to the challenges;
    store the challenges and responses in the non-transitory storage medium, and thereafter
    issue a command to place the PUF device in a standard mode in which the PUF device provides responses to challenges in an encrypted form.

* * * * *